United States Patent Office.

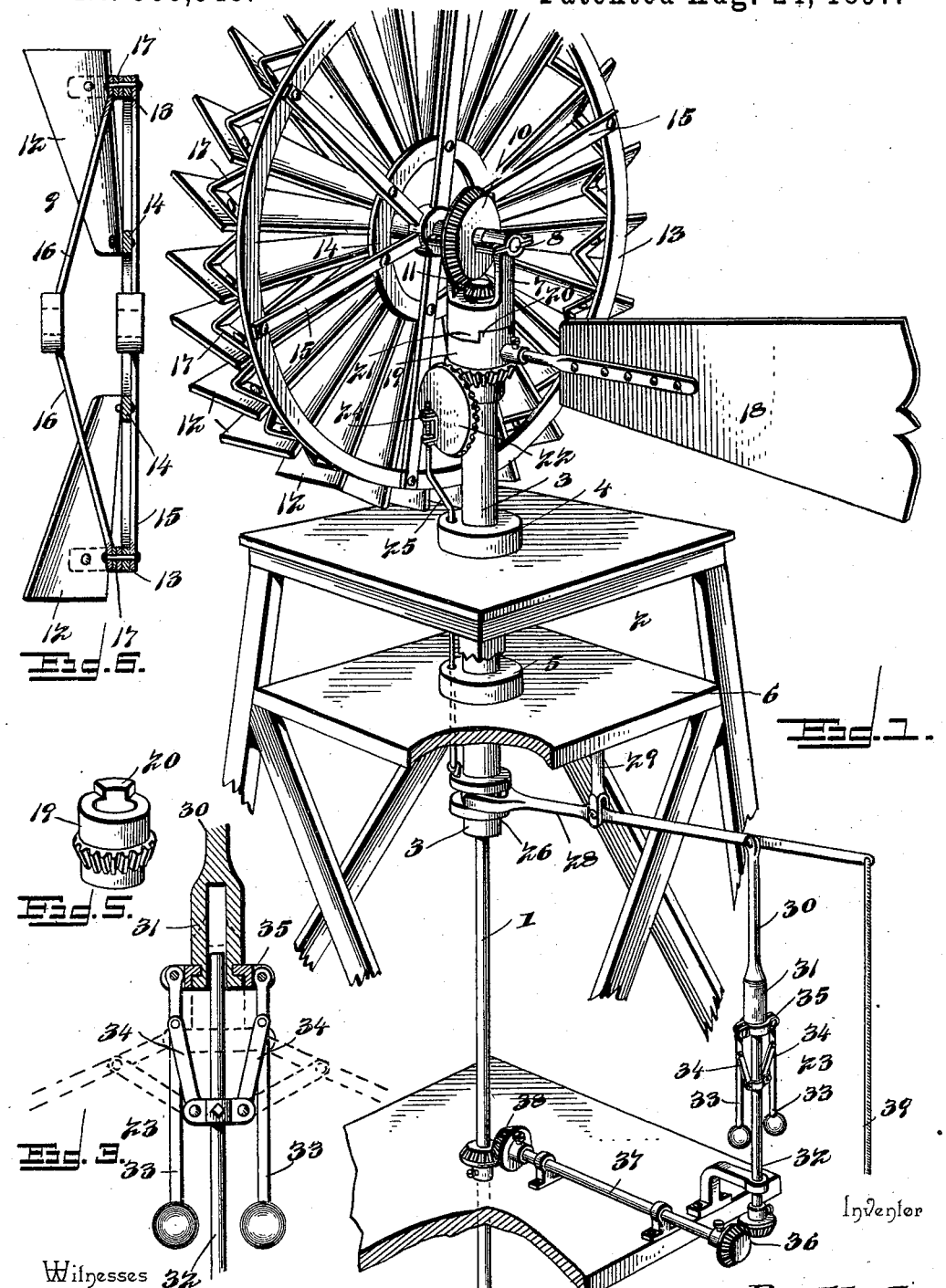

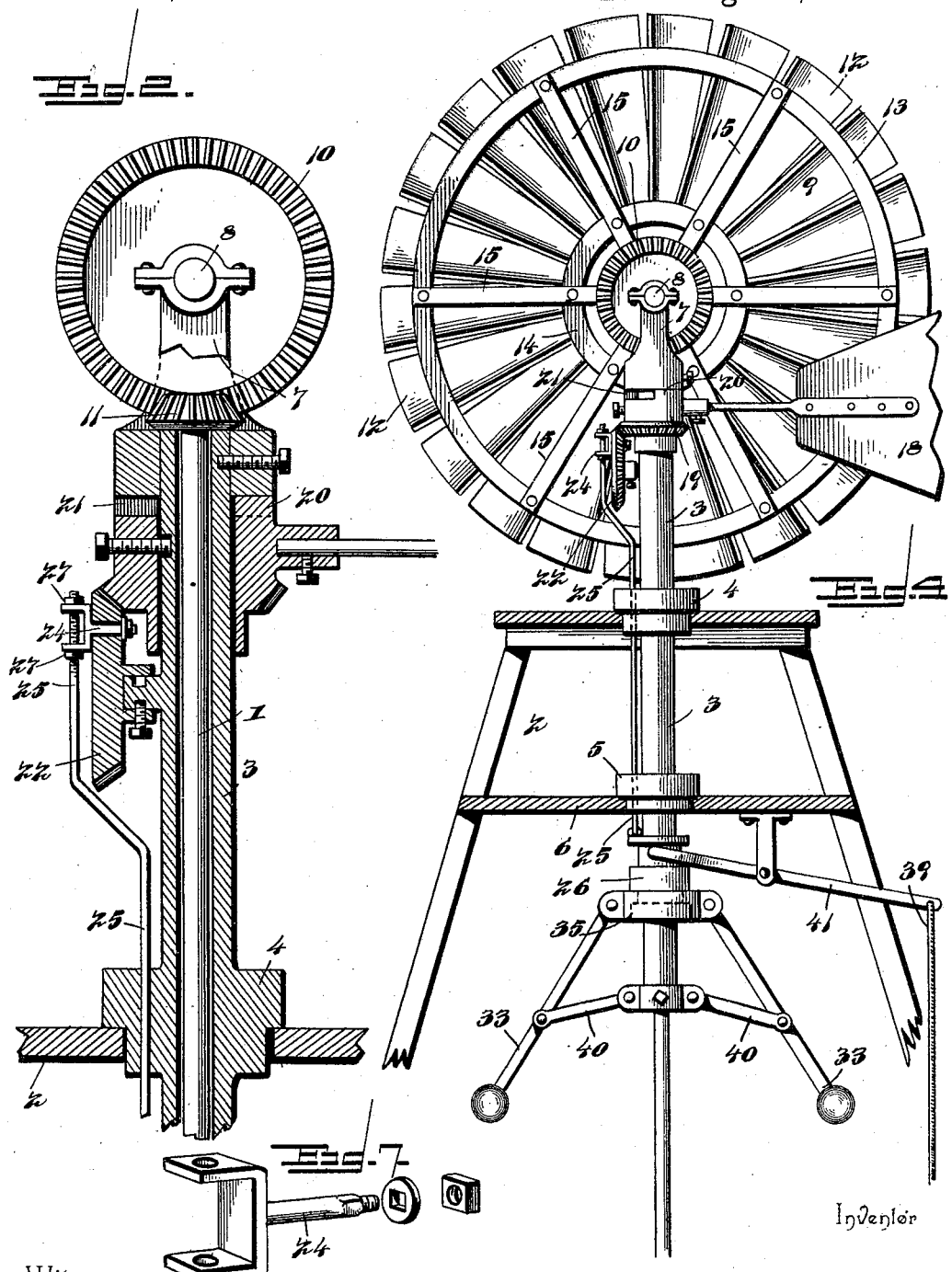

HENRY BARTHELS, OF MISHICOTT, WISCONSIN.

WINDMILL-REGULATOR.

SPECIFICATION forming part of Letters Patent No. 588,548, dated August 24, 1897.

Application filed February 4, 1897. Serial No. 621,985. (No model.)

*To all whom it may concern:*

Be it known that I, HENRY BARTHELS, a citizen of the United States, residing at Mishicott, in the county of Manitowoc and State of Wisconsin, have invented a new and useful Windmill-Regulator, of which the following is a specification.

The invention relates to improvements in windmill-regulators.

The object of the present invention is to improve the construction of windmill-regulators and to provide a simple and efficient one capable of automatically controlling the vane to turn the wind-wheel out of the wind and to return it into the same as the force of the wind increases and diminishes, and thereby cause the wind-wheel to rotate at a uniform speed in variable winds.

The invention consists in the construction and novel combination and arrangement of parts hereinafter fully described, illustrated in the accompanying drawings, and pointed out in the claims hereto appended.

In the drawings, Figure 1 is a perspective view of a windmill provided with a regulator constructed in accordance with this invention. Fig. 2 is a vertical sectional view. Fig. 3 is an enlarged sectional view of the governor. Fig. 4 is a side elevation, partly in section, illustrating a modification of the invention and showing the governor mounted directly on the vertical main shaft of the windmill. Fig. 5 is a detail perspective view of the gear of the vane. Fig. 6 is a vertical sectional view of the wind-wheel. Fig. 7 is a detail perspective view of the wrist-pin of the gear-wheel which meshes with the gear of the vane.

Like numerals of reference designate corresponding parts in all the figures of the drawings.

1 designates a vertical shaft mounted in a tower 2 and arranged in a bearing-tube 3, extending above and below the top of the tower and provided with upper and lower annular flanges or collars 4 and 5, which are journaled in suitable bearings at the top of the tower and at a platform 6, located a short distance below the top of the tower. A forked bearing-bracket 7 is mounted on the upper end of the bearing-tube and is composed of two sides and a connecting-sleeve receiving the vertical bearing-tube and secured to the same by means of set-screws or the like.

The sides of the bearing-bracket 7 are provided at their upper ends with sectional journal-boxes receiving a horizontal wind-wheel shaft 8, which carries a wind-wheel 9 and a vertical gear-wheel 10. The vertical gear-wheel 10 has its hub extending entirely across the space between the sides of the bearing-bracket, and it meshes with a horizontal pinion 11, which is keyed or otherwise secured to the upper end of the main shaft 1, whereby when the wind-wheel rotates motion will be communicated to the vertical shaft.

The wind-wheel is provided with fixed blades 12, arranged at an angle and secured to inner and outer rings or rims 13 and 14. The rings or rims 13 and 14 are preferably composed of a series of sections, each section carrying a series of blades, and when the sections are assembled they are supported by radial spokes 15 and similarly-disposed braces 16. The blades are supported at the proper angle by a circular brace 17, secured to the outer ring or rim and provided with a series of V-shaped bends, forming angularly-disposed portions to receive the blades.

The wind-wheel is held in the wind by a vane 18, which is connected with a gear 19, consisting of a sleeve journaled on the bearing-tube, at the upper end thereof, and capable of a quarter-revolution to swing the vane from a position at right angles to the plane of the wind-wheel to a position parallel with the said wind-wheel to hold the wind-wheel into the wind and to throw the windmill out of operation.

The gear 19, which consists of a sleeve, is provided at its upper edge with a projection 20, arranged in a recess 21 of the lower edge of the sleeve of the bearing-bracket. The recess 21 forms shoulders which are engaged by the projection 20 and limit the swing of the vane to one-quarter of a revolution, so that it may be turned from a position at right angles to the plane of the wind-wheel to a position parallel with the latter.

The gear 19 is provided at its lower edge with teeth or cogs which mesh with corresponding teeth of a gear-wheel 22, and the latter is connected, by means hereinafter described, with a governor 23, which operates with centrifugal force and which is adapted to shift the position of the gear 19, and thereby turn the wind-wheel more or less out of the wind as the latter increases in force and to return the wind-wheel into the wind as the force of the same diminishes, whereby the wind-wheel is caused to revolve at a uniform speed in variable winds.

The gear-wheel 22, which is disposed vertically, is journaled on a stub shaft or pin of the bearing-tube, and it is provided with a wrist-pin 24, to which a connecting-rod 25 is secured. The connecting-rod passes through guide-openings of the upper and lower collars 4 and 5, and it is secured at its lower end to a sliding sleeve 26, which is connected to the bearing-tube, at the lower end thereof, by a suitable feather or spline. The wrist-pin 24 consists of a bolt secured to the gear-wheel 22 by a washer and nut and provided in its head with an opening receiving the connecting-rod. The upper end of the connecting-rod is threaded and is provided with nuts 27, arranged above and below the head of the wrist-pin and enabling the parts to be readily adjusted. The threaded portion of the connecting-rod is round, but the rest of the rod is preferably flat.

The sliding sleeve 26, which is adapted to move vertically on the bearing-tube, is provided with an annular groove which is engaged by a shifting-lever 28, fulcrumed on a suitable hanger 29 and having its inner end forked and embracing the grooved portion of the sliding sleeve. The shifting-lever is pivotally connected to the upper end of a vertical rod 30, provided at its lower end with a tubular portion 31, which is slidingly mounted on the upper end of a vertical shaft 32. The arms 33 of the governor 23 are swiveled at their upper ends to the lower end of the rod 30 and are connected between their ends with the shaft 32 by upwardly-extending links 34. The lower ends of the governor-arms are provided with weights of any suitable construction, and when the shaft 32, which is connected with the main shaft 1 by gearing hereinafter described, rotates the centrifugal force throws the governor-arms outward. The outward movement of the governor-arms, which are fulcrumed near their upper ends, causes the rod 30 to slide downward on the shaft 32, and the connecting-rod 25, through the lever 28, is forced upward to rotate the gear-wheel 22 and swing the vane toward the wind-wheel. The governor is set to cause the wind-wheel to rotate at the desired speed, and should the force of the wind be great enough to cause the wind-wheel to rotate more rapidly the governor turns the wind-wheel partially out of the wind, and thereby counteracts the effect of the increased force of the wind and secures uniform rotation. As the force of the wind diminishes the governor-arms move inward and return the wind-wheel to the wind.

The upper ends of the governor-arms are pivoted to a sectional band 35, which is arranged in an annular groove of an enlargement or collar of the lower end of the rod 30.

The lower end of the shaft 32 is connected by beveled gearing 36 with the outer end of the horizontal shaft 37, and the inner end of the latter is connected by beveled gearing 38 with the vertical shaft 1.

An operating rope or wire 39 is connected with the outer end of the shifting-lever 28 and extends to the base of the tower in order that the windmill may be operated by hand to throw it out of or into operation. The weights of the governor serve to hold the wind-wheel normally in the wind, and by regulating the weight the wind-wheel may be set for any given speed.

In Fig. 4 of the accompanying drawings is illustrated a modification of the invention, and the governor is shown mounted directly on the main shaft 1, the upper ends of the governor-arms being swiveled to the sliding sleeve, which is connected with the lower end of the rod 25. In this construction the governor operates substantially the same as that heretofore described with the exception that the links 40 extend downward from the main shaft 1 to cause the governor-arms in swinging outward to move the connecting-rod upward.

When the governor is mounted directly on the main shaft 1, the windmill is thrown out of the wind by a lever 41, fulcrumed between its ends and having its inner end forked and engaging an annular groove with the sleeve, and a wire or rope is attached to the outer end of the lever 41 to enable the same to be operated from the base of the tower.

Any suitable gearing may be employed for transmitting motion from the main shaft 1 to the pump or other device designed to be operated.

It will be seen that the windmill-regulator is simple and comparatively inexpensive in construction, that it is positive and reliable in operation, and that it is capable of automatically controlling the vane of a windmill to turn the wind-wheel to and from the wind and expose it to a greater or less extent, whereby it is caused to rotate at a uniform speed in variable winds.

Changes in the form, proportion, and minor details of construction may be resorted to without departing from the principle or sacrificing any of the advantages of the invention.

What I claim is—

1. In a windmill, the combination of a wind-wheel shaft, a wind-wheel, a vane provided with a gear and hinged by the same, a governor, a vertical gear meshing with the said gear, and gearing connecting the governor with the wind-wheel and with the vertical gear, whereby the vane will be automatically turned to regulate the speed of the wind-wheel, substantially as described.

2. In a windmill, the combination of a tower, a wind-wheel, a gear-wheel mounted on the wind-wheel shaft, a vertical main shaft provided at its upper end with a pinion meshing with the said gear-wheel, a hinged vane provided with a gear, a sliding sleeve capable of movement vertically of the main shaft, a gear-wheel connected with the sliding sleeve and meshing with the gear of the vane, and a governor having outwardly-swinging arms, connected with the sliding sleeve and adapted to raise and lower the same to swing the vane, said governor being rotated by the main shaft, substantially as described.

3. In a windmill, the combination of a tower, a bearing-tube mounted on the tower, a wind-wheel carried by the bearing-tube, a vertical shaft arranged within the bearing-tube, gearing connecting the wind-wheel shaft and the vertical shaft, a vane provided with a toothed sleeve arranged on the tube, a gear-wheel journaled on the tube and meshing with the sleeve, a sliding sleeve mounted on the lower end of the tube, a connecting-rod extending from the sliding sleeve to the said gear-wheel, and a centrifugal governor rotated by the main shaft and connected with the sliding sleeve, substantially as and for the purpose described.

4. In a windmill, the combination of a wind-wheel shaft, a hinged vane provided with a gear, a main shaft connected with and rotated by the wind-wheel shaft, a gear-wheel meshing with the gear of the vane, a shifting-lever connected with and adapted to operate the gear-wheel, a vertical shaft 32, gearing connecting the vertical shaft with the main shaft, a rod extending from the shifting-lever to the shaft 32 and slidingly connected with the latter, and a governor having arms fulcrumed on the shaft 32, connected with the rod and adapted to raise and lower the shifting-lever, substantially as described.

5. In a windmill, the combination of a wind-wheel shaft, a hinged vane provided with a gear, a vertical shaft connected with and rotated by the wind-wheel shaft, a vertical gear-wheel meshing with the gear of the vane, a shifting-lever connected with and adapted to swing the vane, and rotary centrifugal governor connected with the shifting-lever, and gearing connecting the rotary governor with the main shaft, substantially as described.

6. In a windmill, the combination of a vertical bearing-tube, a wind-wheel shaft, a vane provided with a horizontal gear mounted on the vertical tube and hinging the vane to the same, a vertical gear-wheel meshing with the gear of the vane, a vertically-reciprocating rod connected with the vertical gear, a governor connected with and operating the said rod, and gearing connecting the governor and the wind-wheel shaft, substantially as described.

7. In a windmill, the combination of a wind-wheel shaft, a hinged vane, a vertical main shaft connected with and rotated by the wind-wheel shaft, a shifting-lever connected with the vane, the rod 30 connected at its upper end to the shifting-lever and provided at its lower end with a tubular portion, the vertical shaft 32 having its upper end arranged within the tubular portion of the rod 30, links connected with the shaft 32, governor-arms fulcrumed on the links and connected with the lower end of the rod 30, and a gear connecting the shaft 32 with the main shaft, substantially as described.

In testimony that I claim the foregoing as my own I have hereto affixed my signature in the presence of two witnesses.

HENRY BARTHELS.

Witnesses:
A. P. RHENIAN,
PEARL SMART.